United States Patent
Guo et al.

(10) Patent No.: US 12,094,450 B2
(45) Date of Patent: Sep. 17, 2024

(54) SPEECH PROCESSING DEVICE, SPEECH PROCESSING METHOD, AND NON-TRANSITORY COMPUTER READABLE MEDIUM STORING PROGRAM

(71) Applicant: NEC Corporation, Tokyo (JP)

(72) Inventors: Ling Guo, Tokyo (JP); Hitoshi Yamamoto, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 336 days.

(21) Appl. No.: 17/616,224

(22) PCT Filed: Jun. 7, 2019

(86) PCT No.: PCT/JP2019/022805
§ 371 (c)(1),
(2) Date: Dec. 3, 2021

(87) PCT Pub. No.: WO2020/246041
PCT Pub. Date: Dec. 10, 2020

(65) Prior Publication Data
US 2022/0238097 A1    Jul. 28, 2022

(51) Int. Cl.
*G10L 15/00* (2013.01)
*G10L 15/04* (2013.01)
*G10L 15/08* (2006.01)
*G10L 25/51* (2013.01)

(52) U.S. Cl.
CPC .............. *G10L 15/04* (2013.01); *G10L 15/08* (2013.01); *G10L 25/51* (2013.01)

(58) Field of Classification Search
CPC ......... G10L 15/04; G10L 15/08; G10L 17/18; G10L 25/51; G10L 17/06; G10L 17/02; G10L 17/08; G10L 17/00
See application file for complete search history.

(56) References Cited

U.S. PATENT DOCUMENTS 5,839,103 A * 11/1998 Mammone .............. G10L 17/20
704/231
10,832,685 B2 * 11/2020 Ding ....................... G10L 17/00
(Continued)

FOREIGN PATENT DOCUMENTS

| JP | H08-076790 A | 3/1996 |
| JP | H11-249684 A | 9/1999 |

(Continued)

OTHER PUBLICATIONS

International Search Report for PCT Application No. PCT/JP2019/022805, mailed on Jul. 16, 2019.

(Continued)

*Primary Examiner* — Douglas Godbold
*Assistant Examiner* — Parker Mayfield

(57) ABSTRACT

A speech processing device includes: first segment means for dividing first speech into a plurality of first speech segments; second segment means for dividing second speech into a plurality of second speech segments; primary speaker recognition means for calculating scores indicating similarities between the plurality of first and second speech segments; threshold value calculation means for calculating a threshold value based on scores indicating similarities between the plurality of first speech segments; speaker clustering means for classifying each of the plurality of second speech segments into one or more clusters having a similarity higher than the similarity indicated by the threshold value; and secondary speaker recognition means for calculating a similarity between each of the one or more clusters and the first speech and determining based on a result of the calculation whether speech corresponding to the first speech is contained in any of the one or more clusters.

10 Claims, 9 Drawing Sheets

(56) References Cited

U.S. PATENT DOCUMENTS

2009/0319269 A1* 12/2009 Aronowitz .............. G10L 17/00 704/243
2020/0279568 A1* 9/2020 Vaquero Avilés-Casco ................ G10L 17/00

FOREIGN PATENT DOCUMENTS

| JP | 3036509 B2 * | 4/2000 |
| JP | 2000-227800 A | 8/2000 |
| JP | 2005-196035 A | 7/2005 |
| JP | 2019-008131 A | 1/2019 |

OTHER PUBLICATIONS

Gregory Sell et al., "Diarization is Hard: Some Experiences and Lessons Learned for the JHU Team in the Inaugural DIHARD Challenge", Proc. Interspeech, 2018, USA, pp. 1-5.

David Snyder et al., "Speaker recognition for multi-speaker conversations using x-vectors", IEEE International Conference on Acoustics, Speech and Signal Processing (ICASSP), 2019, USA, pp. 1-5.

Jitendra Ajmera et al., "Robust Speaker Change Detection", IEEE Signal Processing Letters, vol. 11, No. 8, Aug. 2004, pp. 649-651.

Yin Ruiqing et al., "Speaker Change Detection in Broadcast TV using Bidirectional Long Short-Term Memory Networks", Proc. Interspeech, Aug. 20-24, 2017, Stockholm, Sweden, pp. 3827-3831.

Extended European Search Report for EP Application No. EP19931913.8 dated on May 11, 2022.

Lie Lu et al : "Content Analysis for Audio Classification and Segmentation", IEEE Transactions on Speech and Audio Processing, vol. 10, No. 7, Oct. 1, 2002.

Garcia-Romero Daniel et al : "Unsupervised Domain Adaptation for I-Vector Speaker Recognition", The Speaker and Language Recognition Workshop, Jun. 16-19, 2014.

* cited by examiner

SPEECH PROCESSING DEVICE, SPEECH PROCESSING METHOD, AND NON-TRANSITORY COMPUTER READABLE MEDIUM STORING PROGRAM

This application is a National Stage Entry of PCT/JP2019/022805 filed on Jun. 7, 2019, the contents of all of which are incorporated herein by reference, in their entirety.

TECHNICAL FIELD

The present disclosure relates to a speech processing device, a speech processing method, and a non-transitory computer readable medium storing a program.

BACKGROUND ART

A speech processing device (speaker recognition device) has been known which determines, based on a similarity between speech to be recognized (recognition speech) input from the outside and registrant's speech (registered speech) stored in advance, whether the recognition speech is a registrant's utterance.

For example, the speech processing device compares an individuality feature extracted from the recognition speech with an individuality feature extracted from the registered speech to calculate a score indicating a similarity therebetween and to determine based on the calculation result (score) whether the recognition speech is the registrant's utterance.

Here, the individuality feature is a feature representing the difference between individuals that can be extracted from speech. For example, the individuality feature can be represented by physical quantities such as spectral envelope characteristics reflecting vocal tract information and fundamental frequency characteristics reflecting vocal cord information, and specifically can be represented using mel-frequency cepstrum coefficients (MFCC). Such a speech processing device (speaker recognition device) is expected to be put into practical use in a wide range as biometric authentication having both accuracy and convenience.

However, the conventional speech processing device may be reduced in performance due to various factors when being used in a real environment. This is because the conventional speech processing device is difficult to extract accurate individuality feature in the real environment. For example, individuality features extracted in a noisy environment may contain noise components. Further, individuality features extracted from respective types of speech of the same person recorded in different facilities are ideally the same, but may be actually different from each other. Therefore, the conventional speech processing device may have problems that the registered speech and the recognition speech deviate in individuality feature from each other by comparison, and as a result, speaker recognition cannot be accurately performed.

In particular, the recognition speech often makes use of speech recorded under an arbitrary environment, and thus may contain voices of persons other than the speaker of the recognition target. As in the case of a noisy environment, when the speech of the speaker of the recognition target and other voices are mixed, performance of the speaker recognition is significantly reduced. In order to solve such problems, various research institutes are proceeding with research and development of related technologies regarding speaker recognition with high performance in consideration of actual use situations.

For example, Non Patent Literature 1 discloses a speaker diarization method of classifying one input speech, in which different types of speech of multiple speakers are mixed, for each speaker. In such a method, after the input speech is divided into short speech segments, an individuality feature is extracted from each of the speech segments. Then, using the extracted individuality feature, speaker clustering of an agglomerative hierarchical clustering (AHC) type is performed. Finally, speaker change point re-detection is performed, and cluster numbers are output into which respective speech segments are classified.

In addition, Non Patent Literature 2 discloses a technique in which the speaker diarization method disclosed in Non Patent Literature 1 is used as pre-processing of speaker recognition. In Non Patent Literature 2, after speaker diarization is performed on recognition speech in which different types of speech of multiple speakers are mixed, speaker recognition is performed, and thus an effect of improving the speaker recognition using the speaker diarization is studied. From the result of the study, it is concluded that accuracy of speaker recognition is improved for the recognition speech, in which different types of speech of multiple speakers are mixed, using the speaker diarization method as pre-processing of speaker recognition.

In the speaker recognition method using the speaker diarization disclosed in Non Patent Literature 2 as pre-processing, first, the recognition speech is divided into short speech segments, and an individuality feature is extracted from each of the speech segments. Then, scores indicating similarities between the speech segments are calculated using the extracted individuality features, clustering of an agglomerative hierarchical clustering (AHC) type is performed based on such scores, and cluster numbers are output into which the respective speech segments are classified. Thereafter, an individuality feature of cluster speech obtained by coupling of the speech segments classified into the same cluster number is obtained, and an individuality feature of each cluster speech is compared with an individuality feature of the registered speech to calculate a score indicating a similarity therebetween. Then, it is determined based on the highest score among the calculated scores whether registrant's speech is contained in the recognition speech in which the plurality of types of speech are mixed. In such a method, the individuality feature can be accurately extracted by classification of the recognition speech, in which the plurality of types of speech of multiple speakers are mixed, into a plurality of types of cluster speech of a single speaker, and thus the accuracy of the speaker recognition can be improved.

Other techniques related to speech recognition are also disclosed in Patent Literatures 1 and 2.

CITATION LIST

Patent Literature

Patent Literature 1: Japanese Unexamined Patent Application Publication No. 2019-008131
Patent Literature 2: Japanese Unexamined Patent Application Publication No. H11-249684

Non Patent Literature

Non Patent Literature 1: Gregory Sell, David Snyder, Alan McCree, Daniel Garcia-Romero, Jesus Villalba, Matthew Maciejewski, Vimal Manohar, Najim Dehak, Daniel Povey, Shinji Watanabe, Sanjeev Khudanpur, "Diarization is Hard: Some Experiences and Lessons Learned for the JHU Team in the Inaugural DIHARD Challenge", Proc. INTERSPEECH, pp. 2808-2812, 2018.

Non Patent Literature 2: David Snyder, Daniel Garcia-Romero, Gregory Sell, Alan McCree, Daniel Povey, Sanjeev Khudanpur, "Speaker recognition for multi-speaker conversations using x-vectors", IEEE International Conference on Acoustics, Speech and Signal Processing (ICASSP), 2019.

Non Patent Literature 3: Jitendra Ajmera, Iain McCowan, and Herve Bourlard, "Robust Speaker Change Detection", IEEE Signal Processing Letters, VOL. 11, NO. 8, pp. 649-651, 2004.

Non Patent Literature 4: Yin Ruiqing, Herve Bredin, and Claude Barras, "Speaker Change Detection in Broadcast TV using Bidirectional Long Short-Term Memory Networks", Proc. INTERSPEECH, pp. 3827-3831, 2017.

SUMMARY OF INVENTION

Technical Problem

However, in the speaker clustering executed in the speaker diarization, it is necessary to determine in advance a threshold value as a criterion for determining whether a certain speech segment is similar to another speech segment. Here, the clustering result by the speaker clustering, particularly, the number of clusters greatly fluctuates depending on the threshold value. Accordingly, the accuracy of speaker recognition also greatly fluctuates. To obtain an optimum threshold value, it is necessary to adjust the threshold value such that a recognition error rate is minimized by preparing a speech corpus containing speech similar to the registered speech and performing speaker recognition after performing speaker diarization on the speech corpus. In this case, since it is necessary to repeat the speaker diarization and the speaker recognition several times, there has been a problem that calculation costs have become huge.

The present disclosure has been made to solve such a problem. In other words, the present disclosure aims to provide a speech processing device, a speech processing method, and a non-transitory computer readable medium storing a program capable of determining with high accuracy whether speech of a specific speaker is contained in a speech signal in which different types of speech of multiple speakers are mixed.

Solution to Problem

A speech processing device according to the present disclosure includes: first segment means for dividing predetermined first speech into a plurality of first speech segments; second segment means for dividing second speech supplied from the outside into a plurality of second speech segments; primary speaker recognition means for calculating scores indicating similarities between the plurality of first speech segments and the plurality of second speech segments; threshold value calculation means for calculating a threshold value based on scores indicating similarities between the plurality of first speech segments among the scores calculated by the primary speaker recognition means; speaker clustering means for classifying each of the plurality of second speech segments into one or more clusters having a similarity higher than the similarity indicated by the threshold value; and secondary speaker recognition means for calculating a similarity between each of the one or more clusters and the first speech and determining based on a result of the calculation whether speech corresponding to the first speech is contained in any of the one or more clusters.

A speech processing method according to the present disclosure includes: a step of dividing predetermined first speech into a plurality of first speech segments; a step of dividing second speech supplied from the outside into a plurality of second speech segments; a step of calculating scores indicating similarities between the plurality of first speech segments and the plurality of second speech segments; a step of calculating a threshold value based on scores indicating similarities between the plurality of first speech segments among the calculated scores; a step of classifying each of the plurality of second speech segments into one or more clusters having a similarity higher than the similarity indicated by the threshold value; and a step of calculating a similarity between each of the one or more clusters and the first speech and determining based on a result of the calculation whether speech corresponding to the first speech is contained in any of the one or more clusters.

A non-transitory computer readable medium storing a program according to the present disclosure, the program causing a computer to execute: a process of dividing predetermined first speech into a plurality of first speech segments; a process of dividing second speech supplied from the outside into a plurality of second speech segments; a process of calculating scores indicating similarities between the plurality of first speech segments and the plurality of second speech segments; a process of calculating a threshold value based on scores indicating similarities between the plurality of first speech segments among the calculated scores; a process of classifying each of the plurality of second speech segments into one or more clusters having a similarity higher than the similarity indicated by the threshold value; and a process of calculating a similarity between each of the one or more clusters and the first speech and determining based on a result of the calculation whether speech corresponding to the first speech is contained in any of the one or more clusters.

Advantageous Effect of Invention

According to the present disclosure, it is possible to provide a speech processing device, a speech processing method, and a non-transitory computer readable medium storing a program capable of determining with high accuracy whether speech of a specific speaker is contained in a speech signal in which different types of speech of multiple speakers are mixed.

DESCRIPTION OF EMBODIMENTS

Figure 1:
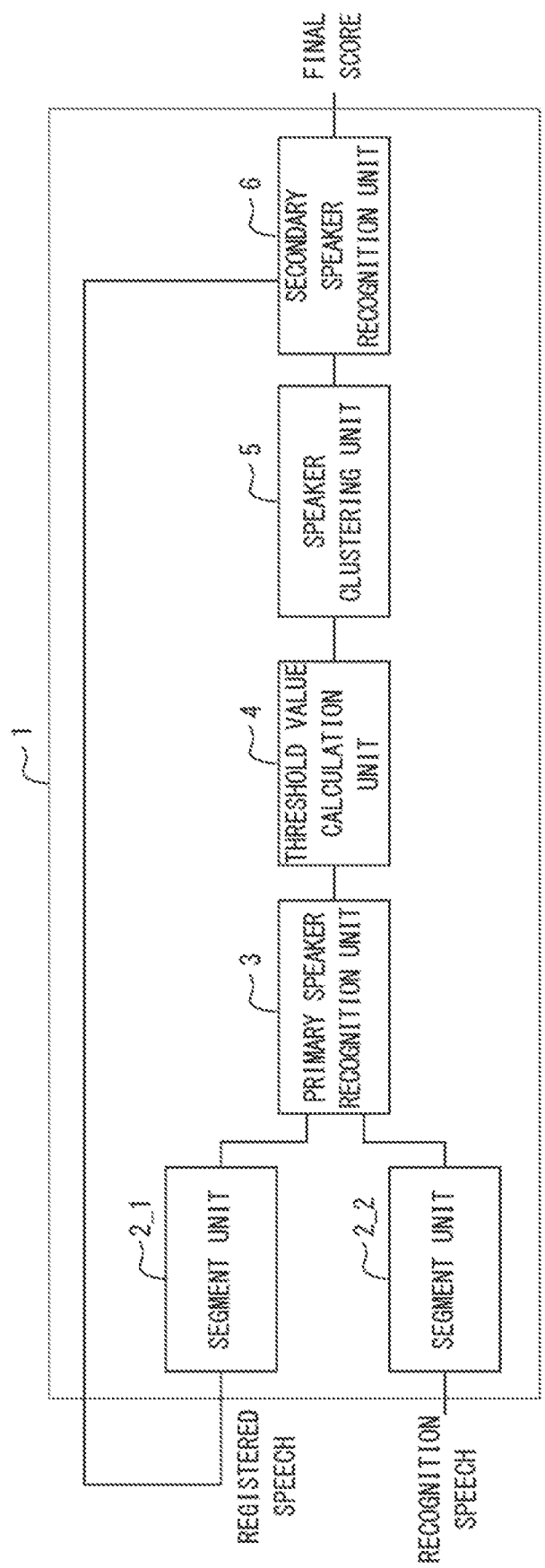
FIG. 1 is a block diagram showing a configuration example of a speaker recognition device according to a first example embodiment.

An example embodiment according to the present disclosure will be described below with reference to the drawings. In the respective drawings, the same or corresponding components are denoted by the same reference numerals, and will not be described as necessary for the sake of clarity of description.

First Example Embodiment

FIG. 1 is a block diagram showing a configuration example of a speaker recognition device (speech processing device) 1 according to a first example embodiment. The speaker recognition device 1 according to the present example embodiment is a device configured to determine with high accuracy whether specific speaker's speech is contained in recognition speech in which a plurality of types of speech of multiple speakers are mixed. Hereinafter, a description will be given in detail.

As shown in FIG. 1, the speaker recognition device 1 includes a segment unit (first segment means) 2_1, a segment unit (second segment means) 2_2, a primary speaker recognition unit (primary speaker recognition means) 3, a threshold value calculation unit (threshold value calculation means) 4, a speaker clustering unit (speaker clustering means) 5, and a secondary speaker recognition unit (secondary speaker recognition means) 6.

<<Segment Unit 2_1 or 2_2>>

The segment unit 2_1 divides registrant's speech (registered speech) stored in advance into a plurality of speech segments A1 to An (n being an integer of 2 or more). In the example of FIG. 1, registered speech fed back from the secondary speaker recognition unit 6 to be described below is supplied to the segment unit 2_1.

The segment unit 2_2 divides speech to be recognized (recognition speech) supplied from the outside into a plurality of speech segments B1 to Bm (m being an integer of 2 or more). The recognition speech is a single channel speech signal having a length of about 3 to 5 minutes, for example.

Figure 2:
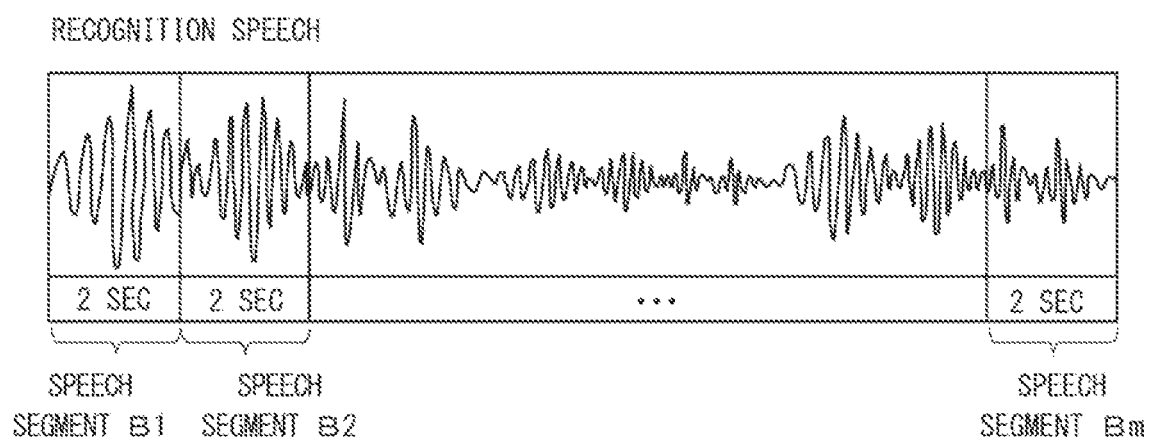
FIG. 2 is a view showing an example of a method of dividing recognition speech into a plurality of speech segments.

FIG. 2 is a view showing an example of a method of dividing the recognition speech into a plurality of speech segments. In the example of FIG. 2, the recognition speech is divided into m speech segments B1 to Bm every two seconds without a gap.

Figure 3:
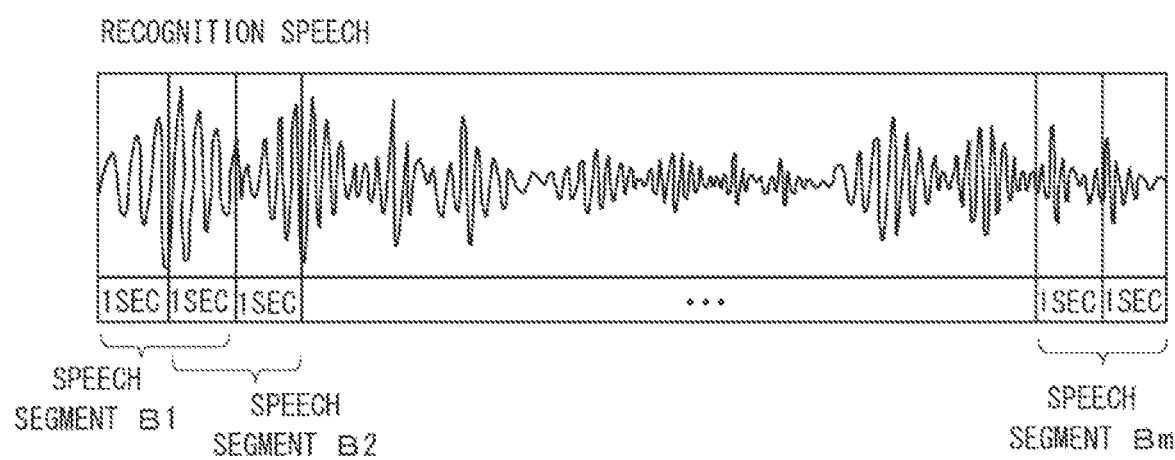
FIG. 3 is a view showing another example of a method of dividing recognition speech into a plurality of speech segments.

FIG. 3 is a view showing another example of a method of dividing the recognition speech into a plurality of speech segments.

In the example of FIG. 3, the recognition speech is divided into m speech segments B1 to Bm every two seconds with an overlap of one second.

In the examples of FIGS. 2 and 3, the segment unit 2_2 divides the recognition speech into the plurality of speech segments B1 to Bm every predetermined time (for example, every two seconds), but is not limited thereto. The segment unit 2_2 may divide the recognition speech into a plurality of speech segments using a change point by a speaker change detection method, for example. The speaker change point detection method is disclosed in Non Patent Literatures 3 and 4, for example.

A method of dividing the registered speech into a plurality of speech segments A1 to An is the same as the method of dividing the recognition speech into the plurality of speech segments B1 to Bm, and thus will not be described.

<<Primary Speaker Recognition Unit 3>>

The primary speaker recognition unit 3 extracts feature representing individuality (individuality feature) from each of the plurality of speech segments A1 to An divided and generated from the registered speech and the plurality of speech segments B1 to Bm divided and generated from the recognition speech. And then, the primary speaker recognition unit 3 performs speaker recognition using these extracted individuality features. Specifically, the primary speaker recognition unit 3 calculates scores indicating similarities between the speech segments using these extracted individuality features.

Herein, the feature representing the speaker's individuality is an i-vector calculated using MFCC (Mel-Frequency Cepstrum Coefficients) that is an acoustic feature. Alternatively, the feature representing the speaker's individuality is an x-vector calculated using DNN (Deep Neural Network). In addition, the speaker recognition is a process of calculating a score regarding whether two utterances are made by the same speaker. The score represents a similarity of an i-vector (or an x-vector) calculated by PLDA (Probabilistic linear discriminant analysis), for example.

Figure 4:
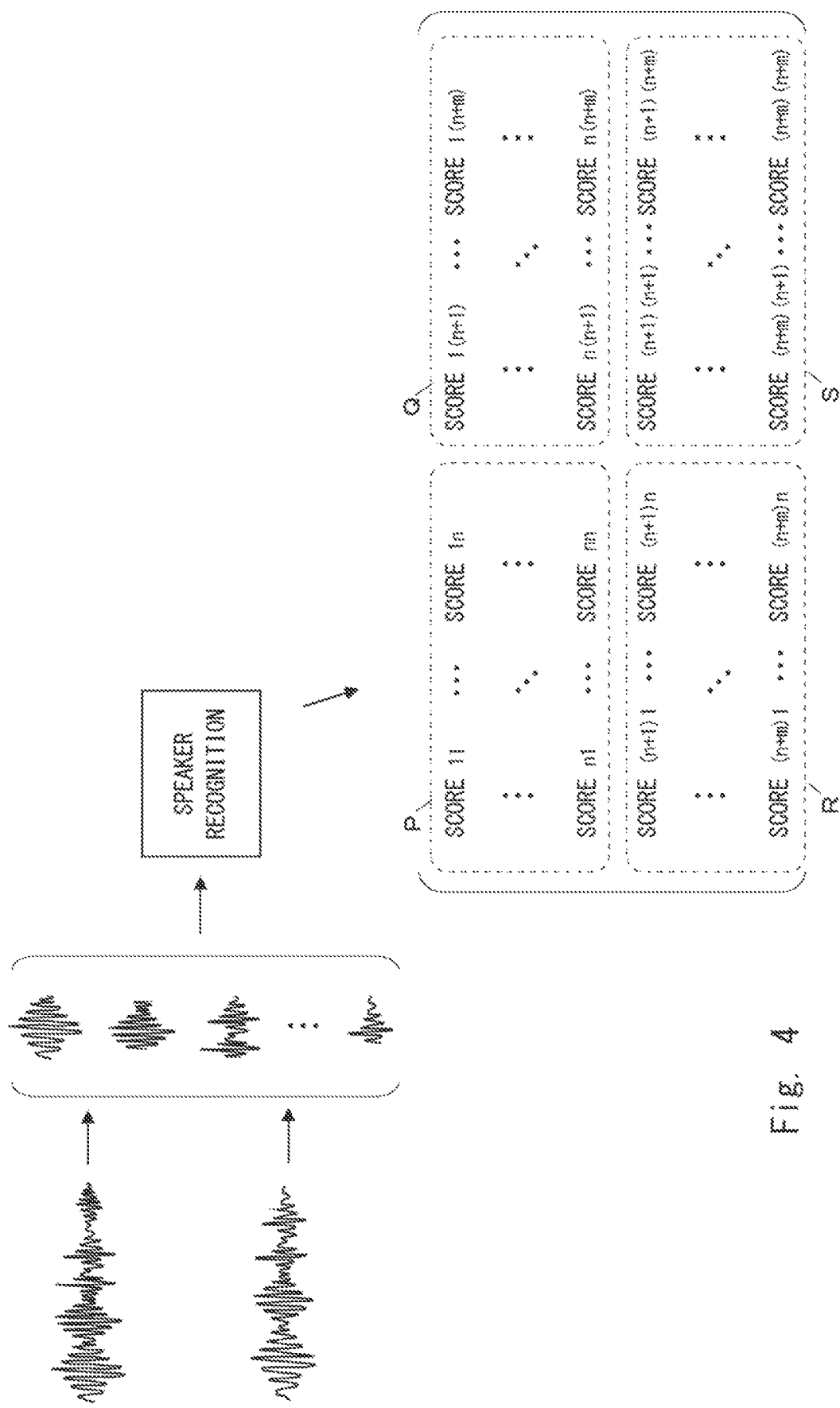
FIG. 4 is a view showing an example of a process in which a score is calculated by a primary speaker recognition unit.

FIG. 4 is a view showing an example of a process in which a score is calculated by the primary speaker recognition unit 3.

As shown in FIG. 4, the number of scores calculated by the primary speaker recognition unit 3 is the square $((n+m)^2)$ of the sum of the plurality of speech segments A1 to An divided and generated from the registered speech and the plurality of speech segments B1 to Bm divided and generated from the recognition speech. In FIG. 4, among a plurality of scores represented in a matrix, the scores at symmetrical positions indicate the same value. For example, $score_{1(n+m)} = score_{(n+m)1}$.

<<Threshold Value Calculation Unit 4>>

The threshold value calculation unit 4 calculates a threshold value based on the plurality of scores calculated by the primary speaker recognition unit 3. Specifically, the threshold value calculation unit 4 calculates a threshold value based on a score group (a score group of a region P in FIG. 4) indicating the similarity between the speech segments A1 to An divided and generated from the registered speech among the plurality of scores calculated by the primary speaker recognition unit 3. Here, the registered speech is single speaker's speech. Therefore, the score group of the region P is a score representing the same person. The threshold value calculation unit 4 outputs one of an average score of the score group of the region P, a minimum score thereof, an average score of some high ranks, and a minimum score thereof, as the threshold value.

<<Speaker Clustering Unit 5>>

The speaker clustering unit 5 performs clustering of the speech segments, based on the plurality of scores calculated by the primary speaker recognition unit 3.

(First Specific Example of Speaker Clustering Unit 5)

First, a first specific example of the speaker clustering unit 5 will be described as a speaker clustering unit 5a. The speaker clustering unit 5a performs clustering of the speech segments B1 to Bm, based on a score group (a score group of a region S in FIG. 4) indicating similarity between the speech segments B1 to Bn divided and generated from the recognition speech among the plurality of scores calculated by the primary speaker recognition unit 3. For the clustering, for example, the above-described AHC method is used. Here, the speaker clustering unit 5a classifies the score group of the region S in FIG. 4 into one or more clusters having a similarity (score) higher than the similarity indicated by the threshold value calculated by the threshold value calculation unit 4.

Figure 5:
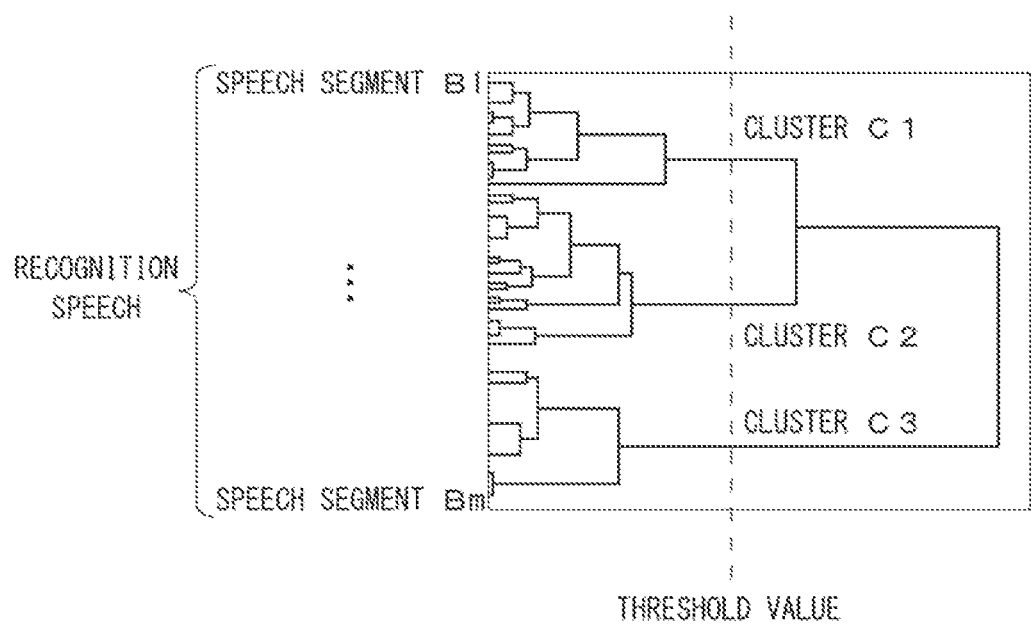
FIG. 5 is a view showing a clustering result of the plurality of speech segments divided and generated from the recognition speech.

FIG. 5 is a view showing a clustering result of the speech segments B1 to Bm divided and generated from the recognition speech. Referring to FIG. 5, the speech segments B1 to Bm divided and generated from the recognition speech is classified into clusters C1 to C3 having a similarity (score) higher than the similarity indicated by the threshold value calculated by the threshold value calculation unit 4.

(Second Specific Example of Speaker Clustering Unit 5)

Next, a second specific example of the speaker clustering unit 5 will be described as a speaker clustering unit 5b. The speaker clustering unit 5b performs, based on all scores (score group in regions P, Q, R, and S in FIG. 4) calculated by the primary speaker recognition unit 3, not only clustering of the speech segments B1 to Bm but also clustering of the speech segments A1 to An. For the clustering, for example, the above-described AHC method is used. Here, the threshold value calculation unit 4 outputs a threshold value such that the speech segments A1 to An divided and generated from the registered speech are classified into one cluster. For example, the threshold value calculation unit 4 sets a score indicating the minimum value (that is, the score indicating the lowest similarity) in the score group indicating the similarity between the speech segments A1 to An divided and generated from the registered speech, as a threshold value.

Figure 6:
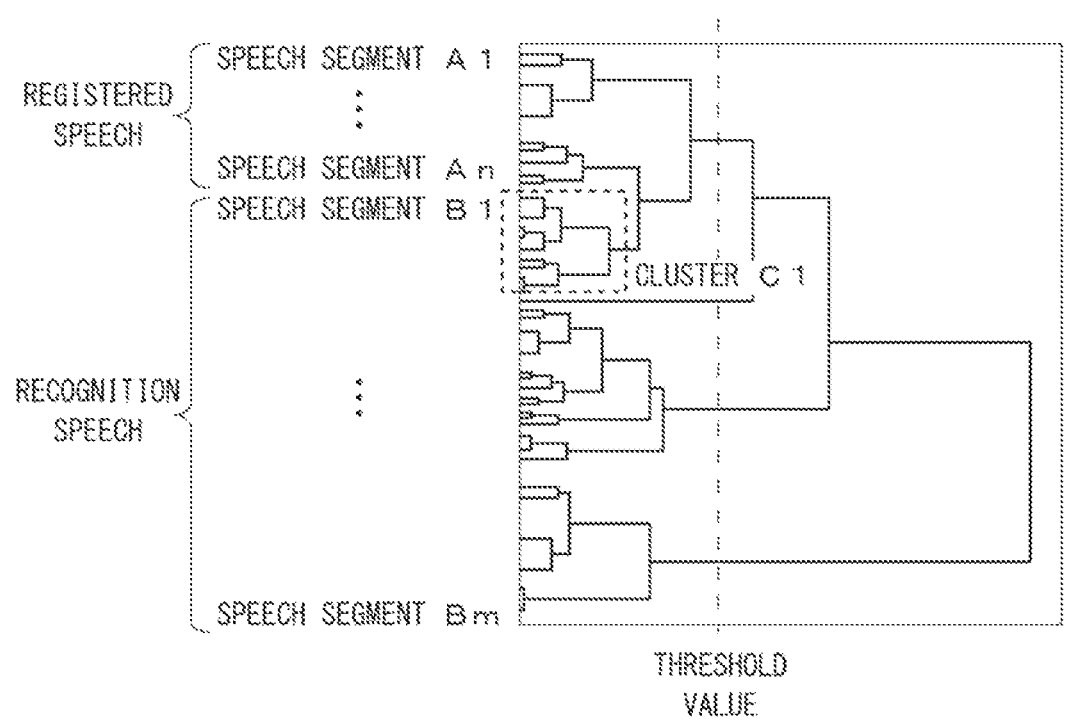
FIG. 6 is a view showing a clustering result of a plurality of speech segments divided and generated from each of registered speech and recognition speech.
Figure 7:
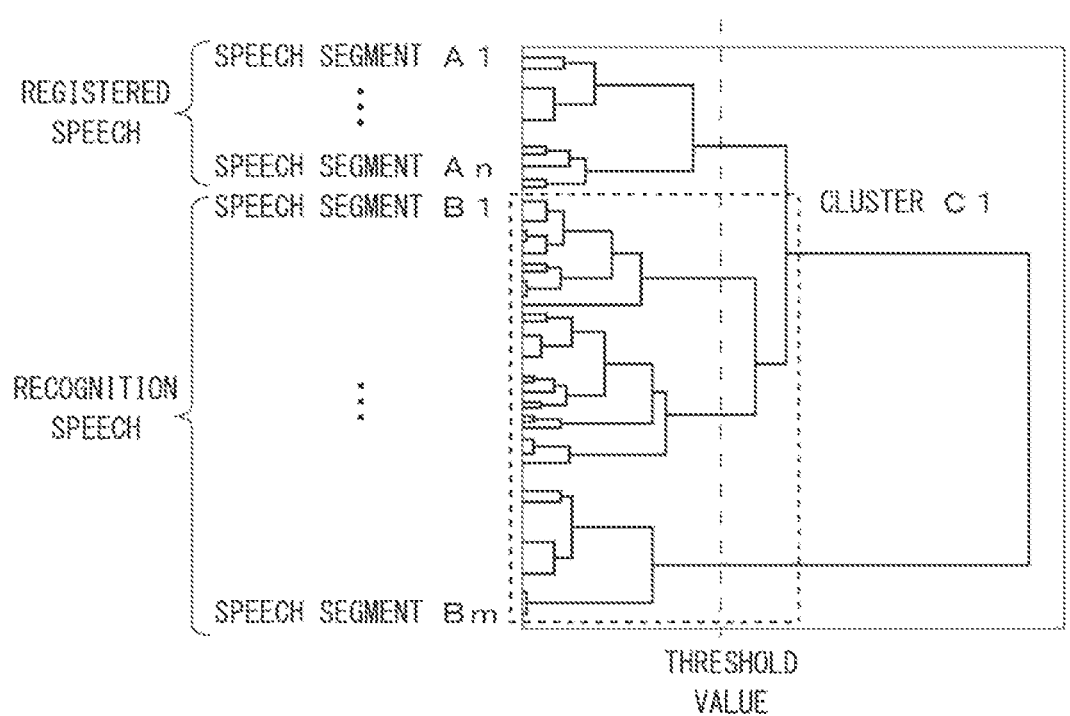
FIG. 7 is a view showing a clustering result of a plurality of speech segments divided and generated from each of registered speech and recognition speech.

FIGS. 6 and 7 are views showing clustering results of a plurality of speech segments divided and generated from each of the registered speech and the recognition speech. As shown in FIGS. 6 and 7, the speech segments A1 to An divided and generated from the registered speech are classified into one cluster.

Here, as shown in FIG. 6, among the speech segments B1 to Bm divided and generated from the recognition speech, the speech segments classified into the same cluster as the speech segments A1 to An divided and generated from the registered speech are classified into one cluster C1. By coupling (combining) of the speech segments classified into such a cluster C1, one cluster speech corresponding to the cluster C1 is generated.

As shown in FIG. 7, when there is no speech segment classified into the same cluster as the speech segments A1 to An divided and generated from the registered speech among the speech segments B1 to Bm, all the speech segments B1 to Bm are classified as one cluster C1. By coupling of the speech segments classified into such a cluster C1, one cluster speech corresponding to the cluster C1 is generated.

(Third Specific Example of Speaker Clustering Unit 5)

Next, a third specific example of the speaker clustering unit 5 will be described as a speaker clustering unit 5c. The speaker clustering unit 5c performs filtering based on a score group (a score group of a region Q in FIG. 4) indicating a similarity between the speech segments A1 to An divided and generated from the registered speech and the speech segments B1 to Bm divided and generated from the recognition speech.

Figure 8:
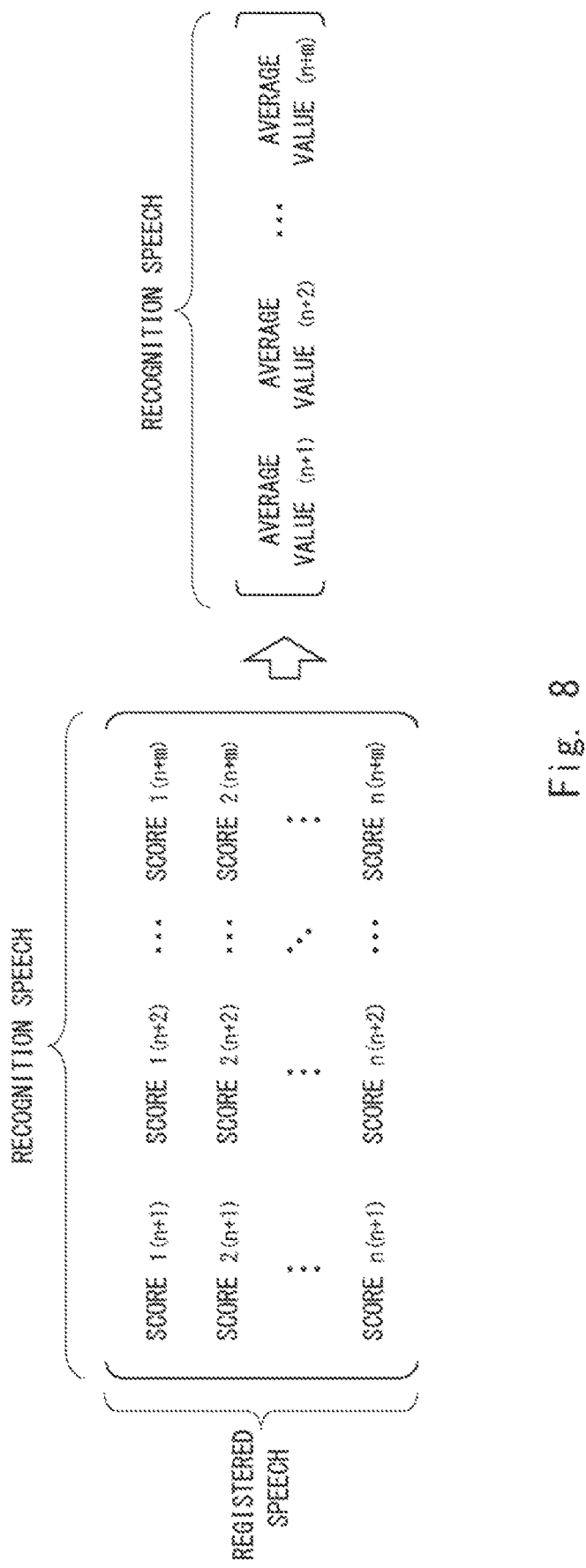
FIG. 8 is a view showing an averaged result of scores indicating similarities between each of the speech segments divided and generated from the recognition speech and the speech segments divided and generated from the registered speech.

FIG. 8 is a view showing an averaged result of scores indicating similarities between each of the speech segments B1 to Bm divided and generated from the recognition speech and the speech segments A1 to Am divided and generated from the registered speech. FIG. 8 also shows scores before averaging. Speech segments corresponding to the average value indicating a value larger than the threshold value (that is, indicating a high similarity) among these averaged values are classified as one cluster C1. By coupling of the speech segments classified into such a cluster C1, cluster speech corresponding to the cluster C1 is generated.

When there is no average value indicating the value larger than the threshold value (that is, indicating a similarity higher than the threshold value) among these averaged values, all of the speech segments B1 to Bm are classified as one cluster C1. By coupling of the speech segments classified into the cluster C1, one cluster speech corresponding to the cluster C1 is generated.

For the clustering, another method may be used without being limited to the AHC method. For example, divisive hierarchical clustering of a top-down approach, may be used instead of the AHC method of a bottom-up approach. Alternatively, any clustering method (for example, a Mean-Shift method) controlled by the threshold value similar to these methods may be used.

<<Secondary Speaker Recognition Unit 6>>

The secondary speaker recognition unit 6 calculates a similarity between the speech of each cluster (cluster speech) and the registered speech, and determines based on such a calculation result whether any cluster speech contains speech corresponding to the registered speech. Specifically, the secondary speaker recognition unit 6 extracts an individuality feature of each cluster speech, and then compares the individuality feature of each cluster with the individuality feature of the registered speech (that is, recognizes the speaker), thereby calculating a score indicating a similarity therebetween and outputting the score as a final score. Then, the secondary speaker recognition unit 6 determines, based on the highest score among these calculation results (final scores), whether the registrant's speech is contained in the recognition speech in which a plurality of types of speech are mixed.

<<Flowchart Showing Operation of Speaker Recognition Device 1>>

Figure 9:
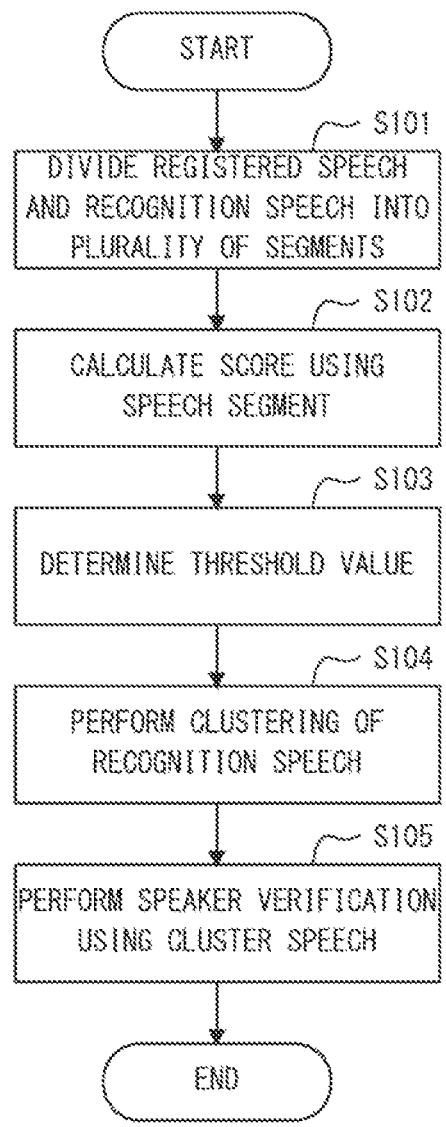
FIG. 9 is a flowchart showing an operation of the speech processing device according to the first example embodiment.

FIG. 9 is a flowchart showing an operation of the speaker recognition device 1.

First, the segment unit 2_1 divides registered speech into a plurality of speech segments A1 to An, and the segment unit 2_2 divides a recognition speech into a plurality of speech segments B1 to Bm (step S101).

Then, the primary speaker recognition unit 3 performs calculation (speaker recognition) of a score indicating a similarity between segments using the speech segments A1 to An divided and generated from the registered speech and the speech segments B1 to Bm divided and generated from the recognition speech (step S102).

Then, the threshold value calculation unit 4 calculates a threshold value based on scores indicating similarities between the speech segments A1 to An divided and generated from the registered speech among the plurality of scores calculated by the primary speaker recognition unit 3 (step S103).

Thereafter, the speaker clustering unit 5 classifies at least each of the speech segments B1 to Bm divided and generated from the recognition speech into one or more clusters having a similarity higher than the similarity indicated by the threshold value (step S104).

Then, the secondary speaker recognition unit 6 calculates a similarity between speech of each cluster (cluster speech) and the registered speech, and determines based on such a calculation result whether any cluster speech contains the speech corresponding to the registered speech (step S105).

As described above, the speaker recognition device 1 according to the present example embodiment can use the threshold value calculation unit 4 to set the threshold value used for clustering to an appropriate value. Thereby, the speaker recognition device 1 according to the present example embodiment can accurately classify the recognition speech, in which the speech of the plurality of speakers are mixed, for each speaker in the speaker clustering unit 5, and thus can determine with high accuracy whether the recognition speech contains the registered speech. In the speaker recognition device 1 according to the present example embodiment, it is not necessary to optimize the threshold value used for clustering at a huge calculation cost.

<<Difference Between Present Application and Cited Literatures>>

In Patent Literature 2, the threshold value used for clustering is calculated based on both the registered speech and the input speaker's speech. Therefore, it is necessary to calculate the threshold value again every time when the input speaker's speech is input. As a result, according to Patent Literature 2, calculation costs become huge. On the other hand, in the speaker recognition device 1 according to the present example embodiment, the threshold value used for clustering is calculated based only on the registered speech. Therefore, in the speaker recognition device 1 according to the present example embodiment, unlike Patent Literature 2, it is not necessary to calculate the threshold value again every time when the recognition speech (the input speaker's speech) is input, a huge calculation cost is prevented.

The present disclosure has been described as a hardware configuration in the above-described example embodiment, but the present disclosure is not limited thereto. The present disclosure can also realize all or part of the processing of the speaker recognition device 1 by causing a CPU (Central Processing Unit) to execute a computer program.

Further, the above-described program can be supplied to a computer in a state of being stored using various types of non-transitory computer readable media. The non-transitory computer readable medium includes various types of tangible storage media. The non-transitory computer readable medium includes, for example, a magnetic recording medium, a magneto-optical recording medium, a CD-ROM (Read Only Memory), a CD-R, a CD-R/W, and a semiconductor memory. The magnetic recording medium is, for example, a flexible disk, a magnetic tape, or a hard disk drive. The magneto-optical recording medium is, for example, a magneto-optical disk. The semiconductor memory is, for example, a mask ROM, a PROM (Programmable ROM), an EPROM (Erasable PROM), a flash ROM, or a RAM (Random Access Memory). In addition, the program may be supplied to the computer by various types of transitory computer readable media. Examples of the transitory computer readable media include an electric signal, an optical signal, and an electromagnetic wave. The transitory computer readable medium can supply the program to the computer via a wired communication path such as an electric wire or an optical fiber, or a wireless communication path.

Although the present disclosure has been described above with reference to the example embodiment, the present disclosure is not limited to the above-described example embodiment. Various modifications that can be understood by those skilled in the art can be made to the configuration and details of the present disclosure within the scope of the present invention.

REFERENCE SIGNS LIST

1 SPEAKER RECOGNITION DEVICE
2_1 SEGMENT UNIT
2_2 SEGMENT UNIT
3 PRIMARY SPEAKER RECOGNITION UNIT
4 THRESHOLD VALUE CALCULATION UNIT
4a THRESHOLD VALUE CALCULATION UNIT
4b THRESHOLD VALUE CALCULATION UNIT
4c THRESHOLD VALUE CALCULATION UNIT
5 SPEAKER CLUSTERING UNIT
6 SECONDARY SPEAKER RECOGNITION UNIT

What is claimed is:

1. A speech processing device comprising:
at least one memory storing instructions; and
at least one processor configured to execute the instructions stored in the memory to:
divide predetermined first speech into a plurality of first speech segments;
divide second speech in which a plurality of types of speech of multiple speakers are mixed into a plurality of second speech segments;
calculate first scores indicating similarities among the plurality of first speech segments, second scores indicating similarities among the plurality of second speech segments, and third scores indicating similarities between the plurality of first speech segments and the plurality of second speech segments;
calculate a threshold value based on the first scores indicating the similarities among the plurality of first speech segments;
classify the plurality of second speech segments into one or more clusters respectively having one or more similarities higher than a similarity indicated by the threshold value;
calculate whether speech corresponding to the first speech is contained in each of the one or more clusters; and
calculate a similarity between each of the one or more clusters and the first speech and determine based on a calculation result of whether the speech corresponding to the first speech is contained in each of the one or more clusters.

2. The speech processing device according to claim 1, wherein all of the plurality of second speech segments are classified into a single cluster different than the one or more clusters when none of the plurality of second speech segments are classified into the one or more clusters respectively having the one or more similarities higher than the similarity indicated by the threshold value.

3. The speech processing device according to claim 1, wherein one of an average score of all of the first scores indicating the similarities between the plurality of first speech segments, a minimum score thereof, an average score of one or more selected scores of the first scores, and a minimum score thereof is calculated as the threshold value.

4. The speech processing device according to claim 1, wherein the plurality of second speech segments are clustered based on the second scores indicating the similarities between the plurality of second speech segments and, for each cluster, the second speech segments clustered into the cluster are combined to generate cluster speech corresponding to the cluster.

5. The speech processing device according to claim 1, wherein
the threshold value is calculated such that all of the plurality of first speech segments are classified into a same cluster, and
the plurality of first speech segments and the plurality of second speech segments classified into the same cluster are combined to generate cluster speech corresponding to the same cluster.

6. The speech processing device according to claim 5, wherein all of the plurality of second speech segments are classified into a single cluster when none of the plurality of second speech segments are classified into the same cluster as the plurality of first speech segments.

7. The speech processing device according to claim 1, wherein average values of the third scores indicating the similarities between each of the second speech segments and the plurality of first speech segments are calculated, and the second speech segments for which the average values are higher than the similarity indicated by the threshold value are combined and output as cluster speech.

8. The speech processing device according to claim 7, wherein all the plurality of second speech segments are combined and output as cluster speech when there are no second speech segments for which the average values are higher than the similarity indicated by the threshold value.

9. A speech processing method performed by a computer and comprising:
dividing predetermined first speech into a plurality of first speech segments;
dividing second speech in which a plurality of types of speech of multiple speakers are mixed into a plurality of second speech segments;
calculating first scores indicating similarities among the plurality of first speech segments, second scores indicating similarities among the plurality of second speech segments, and third scores indicating similarities between the plurality of first speech segments and the plurality of second speech segments;
calculating a threshold value based on the first scores indicating the similarities among the plurality of first speech segments;
classifying the plurality of second speech segments into one or more clusters respectively having one or more similarities higher than a similarity indicated by the threshold value;
calculating whether speech corresponding to the first speech is contained in each of the one or more clusters; and
calculating a similarity between each of the one or more clusters and the first speech and determine based on a calculation result of whether the speech corresponding to the first speech is contained in each of the one or more clusters.

10. A non-transitory computer readable medium storing a program that causes a computer to execute:
a process of dividing predetermined first speech into a plurality of first speech segments;
a process of dividing second speech in which a plurality of types of speech of multiple speakers are mixed into a plurality of second speech segments;
a process of calculating first scores indicating similarities among the plurality of first speech segments, second scores indicating similarities among the plurality of second speech segments, and third scores indicating similarities between the plurality of first speech segments and the plurality of second speech segments;
a process of calculating a threshold value based on the first scores indicating the similarities among the plurality of first speech segments;
a process of classifying the plurality of second speech segments into one or more clusters respectively having one or more similarities higher than a similarity indicated by the threshold value;
a process of calculating whether speech corresponding to the first speech is contained in each of the one or more clusters; and
a process of calculating a similarity between each of the one or more clusters and the first speech and determine based on a calculation result of whether the speech corresponding to the first speech is contained in each of the one or more clusters.

* * * * *